3,832,312
PROCESS FOR MAKING FOAMED STYRENE POLYMERS PHOTODEGRADABLE

Harold A. Wright, Murrysville, Pa., assignor to Arco Polymers, Inc.
No Drawing. Filed Mar. 12, 1973, Ser. No. 340,162
Int. Cl. C08c 17/10
U.S. Cl. 260—2.5 HB      1 Claim

ABSTRACT OF THE DISCLOSURE

Expandable styrene polymer particles which are photodegradable are produced by suspending styrene polymer particles in an aqueous medium and impregnating a blowing agent into the particles in the presence of 0.05–3.0 parts of benzophenone per 100 parts of polymer particles.

BACKGROUND OF THE INVENTION

This invention relates to a process for making foamed styrene polymers photodegradable by incorporating benzophenone into the polymer during the impregnation of the polymers with a blowing agent.

The making of low density, cellular, shaped, plastic articles from expandable particles of styrene polymers is well known. Such particles generally contain a blowing agent which boils below the softening point of the polymer and which will cause the particles to expand when they are heated. When the expanded particles are heated in a mold cavity, the particles expand further to fill the mold and fuse together to form a shaped article. Examples of articles made by this process are drinking cups, meat packaging trays, egg cartons, fruit packaging trays, and the like.

The articles so produced are generally quite stable to sunlight and weather conditions. It is desirable, however, to provide a method whereby discarded foamed articles will degrade under outdoor weather conditions to help disposal problems and prevent litter accumulation.

Many additives have been developed which accelerate the degradation of plastic articles and much experimentation is being done to develop new systems. The additives are generally added to the polymers by physical mixing, such as blending, or by simultaneous extrusion of the polymer and additive. One such additive is benzophenone, a compound known to be a photosensitizer.

SUMMARY OF THE INVENTION

In accordance with the invention, benzophenone is incorporated into styrene polymer particles during the process of impregnating the particles with a blowing agent. Incorporation of from 0.5 to 3.0 parts of benzophenone per 100 parts of polymer gives a foamable product which, when foamed, is degradable by sunlight and weather much more rapidly than is the untreated polymer.

DETAILED DESCRIPTION OF THE INVENTION

In accordance with this invention, a variety of expandable thermoplastic homopolymers and copolymers can be rendered degradable. The polymers may be derived from vinyl aromatic monomers including styrene, vinyltoluene, isopropylstyrene, alpha-methylstyrene, nuclear methylstyrenes, chlorostyrene, tert-butylstyrene, etc., as well as copolymers prepared by the copolymerization of a vinyl aromatic monomer with monomers such as butadiene, alkyl methacrylates, alkyl acrylates, acrylonitrile and maleic anhydride wherein the vinyl aromatic monomer is present in at least 50% by weight of the copolymer. For the purpose of convenience, these polymers and copolymers are referred to herein as styrene polymers.

The styrene polymers can, of course, be produced by any of the known techniques. The preferred method of preparation is the suspension technique, which gives bead or pellet shaped product.

The benzophenone may be added to the polymer particles after the particles have been completely polymerized (i.e., as a hard bead impregnation). Addition of benzophenone prior to substantially complete polymerization can result in upsetting the delicate balance needed for the polymerization reaction and would result in interference with the reaction. The addition, in this instance, is to the aqueous suspension in which the particles were prepared and prior to separation of the particles from the aqueous reaction medium. The blowing agent can be added either prior to hard bead formation or simultaneously with the benzophenone.

Alternatively, particles of styrene polymer may be resuspended in an aqueous medium and impregnated with blowing agent and benzophenone. In this case, suspending agents are added to the water to keep the particles from agglomerating at the elevated temperatures used during the impregnation process. Suitable suspending agent systems are, for example, those described in D'Alelio patent 2,983,692, such as tricalcium phosphate in combination with an anionic surfactant.

The impregnation is conventionally carried out at temperatures ranging from about 80° to 150° C. Increasing the temperature makes the impregnation proceed at a faster rate.

The blowing agents are compounds which are gases or which will produce gases on heating. Preferred blowing agents include aliphatic hydrocarbons containing from 1–7 carbon atoms in the molecule, such as methane, ethane, propane, butane, pentane, hexane, heptane, cyclohexane, and their halogenated derivatives which boil at a temperature below the softening point of the polymer. Mixtures of these agents may also be used, such as a mixture of 40–60% n-pentane and 60–40% trichlorofluoromethane. Usually from 3 to 20% of blowing agent per 100 parts of polymer is incorporated by the impregnation.

The benzophenone is added to the suspension of polymer particles at the same time as the blowing agent. Best results are obtained when amounts of benzophenone between 0.5 and 3.0 parts per 100 parts of polymer are added. Less than 0.5 part of benzophenone does not give sufficiently accelerated rates, while greater than 3.0 parts of benzophenone tend to plasticize the polymer particles and cause difficulty in the molding process.

The invention is further illustrated by the following example wherein parts are parts by weight unless otherwise indicated.

Example I

To a reactor, there was charged in sequence 100 parts of water, 0.025 part of sodium dodecylbenzenesulfonate, 1.0 part of benzophenone, 2.0 parts of tricalcium phosphate, 100 parts of polystyrene beads having a particle size of predominantly through 16 and on 35 mesh, U.S. Standard Sieve, and 9.0 parts of n-pentane. The mixture was stirred and heated during 1 hour to 90° C. to form a suspension. The suspension was maintained at 90° C. for 3 hours and then the temperature was raised during 0.5 hour to 115° C. and maintained at that temperature for an additional 6 hours. The suspension was cooled to room temperature and acidified to a pH of 1.4 with HCl. The beads were separated from the aqueous phase by centrifuge, washed with water, and air dried at room temperature. A control experiment was run using the above procedure omitting the benzophenone.

The beads from the above impregnation process were pre-expanded to a density of about 1.26 pounds per cubic foot (p.c.f.). The pre-expanded beads were then molded into strips of foam 1" x 5" x ½" of approximately 1.5 p.c.f. density. These strips were masked with aluminum foil, wrapped around the long axis, such that about half the strip was protected. The strips were then placed flat beneath a 20-watt fluorescent sunlamp such that the exposed half of the strips were about 3 inches from the light. After one 96-hour lamp exposure, the strip containing the benzophenone showed gross yellowing and embrittlement compared to the control strip.

The strips were also subjected to alternate 96-hour lamp exposure followed by an air jet treatment to remove the embrittled polymer. After 4 such alternate treatments the strip containing benzophenone had lost 31.1% of its total weight compared to only a 10.5% weight loss for the control strip.

Similar preparation and treatment of samples containing 2.0 and 2.5 parts of benzophenone per 100 parts of polystyrene showed that the degradation due to ultraviolet light was greater with greater amounts of the sensitizer. The beads containing 2.5 parts of benzophenone were easily prepared by the process of the invention, but were difficult to mold into acceptable foam strips due to excessive plasticizing action of the sensitizer on the polystyrene.

What is claimed is:

1. A process for making expandable styrene polymer particles containing a photosensitizer comprising suspending styrene polymer particles with the aid of a suspending agent in water containing a blowing agent and benzophenone, heating the suspension at a temperature from about 80° to 150° C. to impregnate the polymer particles, and separating the impregnated particles from the water; said benzophenone being present in an amount of 0.5–3.0 parts per 100 parts of said polymer particles.

References Cited
UNITED STATES PATENTS 3,349,018 10/1967 Potts _____ 260—Dig. 43
3,650,992 3/1972 Schwoegler _____ 260—2.5 B MELVYN I. MARQUIS, Primary Examiner U.S. Cl. X.R.

204—159.2; 260—2.5 B, Dig. 43